(12) United States Patent
Scheid et al.

(10) Patent No.: US 11,913,643 B2
(45) Date of Patent: Feb. 27, 2024

(54) ENGINE WIRELESS SENSOR SYSTEM WITH ENERGY HARVESTING

(71) Applicant: RTX Corporation, Farmington, CT (US)

(72) Inventors: Paul Raymond Scheid, West Hartford, CT (US); Paul A. Adamski, Westfield, MA (US); Eli Cole Warren, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 1007 days.

(21) Appl. No.: 16/502,082

(22) Filed: Jul. 3, 2019

(65) Prior Publication Data

US 2020/0333004 A1    Oct. 22, 2020

Related U.S. Application Data

(60) Provisional application No. 62/835,165, filed on Apr. 17, 2019.

(51) Int. Cl.
*F23N 5/00*        (2006.01)
*G05B 23/02*       (2006.01)
(Continued)

(52) U.S. Cl.
CPC .............. *F23N 5/003* (2013.01); *F02C 7/268* (2013.01); *G05B 23/0254* (2013.01);
(Continued)

(58) Field of Classification Search
CPC . F23N 5/003; F23N 2241/20; G05B 23/0254; H04B 7/18506; F05D 2260/408; F01D 15/10; F01D 17/00
See application file for complete search history.

(56) References Cited

U.S. PATENT DOCUMENTS 6,167,239 A    12/2000  Wright et al.
6,173,159 B1   1/2001   Wright et al.
(Continued)

FOREIGN PATENT DOCUMENTS

EP    1400942 A2    3/2004
EP    2378490 A1    10/2011
(Continued)

OTHER PUBLICATIONS

European Office Action for European Application No. 20170098.6; dated Jun. 30, 2022, 6 pages.
(Continued)

*Primary Examiner* — Brian J. Gillis
*Assistant Examiner* — Thao D Duong
(74) *Attorney, Agent, or Firm* — CANTOR COLBURN LLP (57) ABSTRACT

A wireless sensor system of a gas turbine engine of an aircraft can include a plurality of wireless sensors distributed within an engine core of the gas turbine engine and an energy harvesting system including one or more energy harvesting devices configured to convert mechanical or thermal energy within the gas turbine engine into electric power and provide the electric power to the wireless sensors. The wireless sensor system can also include a data concentrator coupled to the gas turbine engine. The data concentrator can be configured to receive a plurality of wireless sensor data from the wireless sensors and transmit the wireless sensor data to a communication adapter of the gas turbine engine.

17 Claims, 5 Drawing Sheets

(51) Int. Cl.
  *F02C 7/268* (2006.01)
  *H04B 7/185* (2006.01)
(52) U.S. Cl.
  CPC ..... *H04B 7/18506* (2013.01); *F05D 2260/80* (2013.01); *F23N 2241/20* (2020.01)

(56) References Cited

U.S. PATENT DOCUMENTS

| | | | |
|---|---|---|---|
| 8,078,354 | B2 | 12/2011 | Loda |
| 8,344,912 | B2 | 1/2013 | Mitchell et al. |
| 8,768,537 | B2 | 7/2014 | Kim et al. |
| 9,253,816 | B1 | 2/2016 | Gashette |
| 9,303,523 | B2 | 4/2016 | Rodriguez et al. |
| 9,367,970 | B2 | 6/2016 | Ziarno |
| 9,435,819 | B1 | 9/2016 | Fraley et al. |
| 9,464,905 | B2 | 10/2016 | Lewis |
| 9,587,576 | B2 | 3/2017 | Stanek et al. |
| 9,915,535 | B2 | 3/2018 | Jordan et al. |
| 10,035,609 | B2 | 7/2018 | Ziarno |
| 10,093,436 | B2 | 10/2018 | Bulumulla et al. |
| 10,114,634 | B2 | 10/2018 | Quin et al. |
| 10,180,074 | B2 * | 1/2019 | Arik ............... F01D 17/02 |
| 10,444,748 | B2 | 10/2019 | Feenstra et al. |
| 10,633,106 | B2 | 4/2020 | Gelwan et al. |
| 10,880,070 | B1 | 12/2020 | Delaney et al. |
| 2001/0038143 | A1 | 11/2001 | Sonobe et al. |
| 2002/0173897 | A1 * | 11/2002 | Leamy ............... F02C 9/28 |
| | | | 701/100 |
| 2004/0056766 | A1 | 3/2004 | Butz et al. |
| 2004/0206818 | A1 | 10/2004 | Loda et al. |
| 2005/0017876 | A1 | 1/2005 | Ziarno |
| 2005/0160259 | A1 | 7/2005 | Ogura et al. |
| 2006/0108988 | A1 | 5/2006 | McKelvey et al. |
| 2006/0251507 | A1 * | 11/2006 | Braswell ............... F01D 17/20 |
| | | | 415/13 |
| 2008/0178659 | A1 * | 7/2008 | Spinelli ............... G01N 25/58 |
| | | | 73/29.01 |
| 2009/0049441 | A1 | 2/2009 | Mii et al. |
| 2009/0119657 | A1 | 5/2009 | Link, II |
| 2010/0049377 | A1 | 2/2010 | Scheid et al. |
| 2012/0324420 | A1 | 12/2012 | Collinson |
| 2013/0006581 | A1 | 1/2013 | Singh et al. |
| 2013/0253735 | A1 * | 9/2013 | Roy ............... F02C 9/28 |
| | | | 701/3 |
| 2013/0332011 | A1 | 12/2013 | Ziarno |
| 2013/0332025 | A1 | 12/2013 | Ziarno |
| 2013/0342360 | A1 * | 12/2013 | Bevly, III ............... H01F 38/14 |
| | | | 336/200 |
| 2014/0123625 | A1 | 5/2014 | Snell |
| 2015/0176502 | A1 * | 6/2015 | Slavens, Jr. ............... F02C 9/28 |
| | | | 60/793 |
| 2015/0330869 | A1 | 11/2015 | Ziarno |
| 2016/0110179 | A1 | 4/2016 | Weckesser et al. |
| 2016/0178464 | A1 | 6/2016 | Burns et al. |
| 2016/0196457 | A1 | 7/2016 | Mylaraswamy et al. |
| 2016/0207639 | A1 | 7/2016 | Ellis et al. |
| 2016/0222889 | A1 | 8/2016 | Snyder |
| 2016/0260265 | A1 | 9/2016 | Buehler et al. |
| 2016/0319845 | A1 * | 11/2016 | Molnar ............... F04D 29/324 |
| 2016/0322826 | A1 | 11/2016 | Okino et al. |
| 2016/0377506 | A1 | 12/2016 | Bizud |
| 2017/0089577 | A1 | 3/2017 | Desilva et al. |
| 2017/0155514 | A1 | 6/2017 | Schulz et al. |
| 2017/0205817 | A1 | 7/2017 | Lyons et al. |
| 2017/0234233 | A1 | 8/2017 | Schwarz et al. |
| 2017/0259942 | A1 | 9/2017 | Ziarno |
| 2017/0287239 | A1 | 10/2017 | Levy |
| 2017/0334576 | A1 | 11/2017 | Shams |
| 2017/0373612 | A1 * | 12/2017 | Sellinger ............... C04B 35/565 |
| 2018/0006916 | A1 | 1/2018 | Scholten et al. |
| 2018/0007136 | A1 | 1/2018 | Scholten et al. |
| 2018/0011481 | A1 | 1/2018 | Smit et al. |
| 2018/0023413 | A1 | 1/2018 | Chowdhury et al. |
| 2018/0023484 | A1 | 1/2018 | Gelwan et al. |
| 2018/0040175 | A1 * | 2/2018 | McConkey ............... G01M 15/14 |
| 2018/0045122 | A1 | 2/2018 | Veilleux |
| 2018/0051587 | A1 | 2/2018 | Fletcher |
| 2018/0167391 | A1 | 6/2018 | Lawson et al. |
| 2018/0170575 | A1 | 6/2018 | Ziarno |
| 2018/0205658 | A1 | 7/2018 | Sullivan |
| 2018/0225629 | A1 | 8/2018 | Brodersen et al. |
| 2018/0297718 | A1 | 10/2018 | Adibhatla |
| 2018/0365265 | A1 | 12/2018 | Blanc et al. |
| 2019/0005744 | A1 | 1/2019 | Curtis et al. |
| 2019/0012853 | A1 | 1/2019 | Scholten et al. |
| 2019/0102162 | A1 | 4/2019 | Pitre et al. |
| 2019/0128191 | A1 * | 5/2019 | Moravek ............... F02C 7/277 |
| 2019/0322299 | A1 | 10/2019 | Mong et al. |
| 2019/0367190 | A1 | 12/2019 | Bewlay et al. |
| 2019/0385057 | A1 | 12/2019 | Litichever et al. |
| 2019/0385120 | A1 | 12/2019 | Yund et al. |
| 2020/0044916 | A1 | 2/2020 | Kaufman et al. |
| 2020/0076596 | A1 | 3/2020 | Chopart |
| 2020/0088108 | A1 * | 3/2020 | Klein ............... F02K 3/06 |
| 2020/0331620 | A1 | 10/2020 | Scheid |
| 2020/0332675 | A1 | 10/2020 | Scheid et al. |
| 2020/0332722 | A1 | 10/2020 | Lamberti et al. |
| 2020/0334925 | A1 | 10/2020 | Scheid et al. |
| 2020/0362766 | A1 | 11/2020 | Lamberti et al. |
| 2020/0378271 | A1 | 12/2020 | Lamberti et al. |
| 2020/0380508 | A1 | 12/2020 | Sheriff |
| 2021/0209868 | A1 | 7/2021 | Scheid et al. |
| 2022/0216910 | A1 | 7/2022 | Lamberti et al. |

FOREIGN PATENT DOCUMENTS

| | | |
|---|---|---|
| EP | 3217364 A2 | 9/2017 |
| EP | 3260939 A1 | 12/2017 |
| WO | 2010028729 A1 | 3/2010 |
| WO | 2018158102 A1 | 9/2018 |

OTHER PUBLICATIONS

Cfmi Customer Training Center Snecma: Training Manual CFM56-5A Engine Systems; dated Apr. 1, 2020; https://eduscol.education.fr/sti/sites/eduscol.education.fr.sti/files/ressources/pedagogiques/11659/11659-ctc-045-engine-systems.pdf; 467 pages.

Extended European Search Report; dated Aug. 24, 2020; EP Application No. 20170086.1-1009; 11 pages.

Extended European Search Report; dated Aug. 24, 2020; Application No. 20167171.6-1202; 8 pages.

Extended European Search Report; dated Sep. 8, 2020; Application No. 20167178.1-1202; 9 pages.

Baek et al., "Making air traffic surveillance more reliable: a new authentication framework for automatic dependent surveillance-broadcast (ADS-B) based on online/offline identity-based signature", Security Comm. Networks 2015; 8: 740-750.

Extended European Search Report; dated Sep. 8, 2020; Application No. 20167253.2-1202; 10 pages.

Extended European Search Report; dated Oct. 2, 2020; Application No. 20170071.3-1202; 11 pagaes.

Extended European Search Report; dated Sep. 25, 2020; Application No. 20170066.3-1009; 12 pages.

Extended European Search Report; dated Sep. 18, 2020; Application No. 20167001.5-1009; 9 pages.

Partial European Search Report; Application No. 20170098.6-1202; dated Sep. 21, 2020; 16 pages.

U.S. Appl. No. 16/839,108, filed Apr. 3, 2020, NonFinal Office Action, dated Mar. 1, 2022, 48 pages.

European Search Report for Application No. 20170098.6-1205; dated Jun. 19, 2023; 8 pages.

* cited by examiner

ENGINE WIRELESS SENSOR SYSTEM WITH ENERGY HARVESTING

CROSS-REFERENCE TO RELATED APPLICATIONS

This application claims the benefit of priority to U.S. Provisional Application No. 62/835,165 filed Apr. 17, 2019, the disclosure of which is incorporated by reference herein in its entirety.

BACKGROUND

The subject matter disclosed herein generally relates to gas turbine engine sensor systems and, more particularly, to a gas turbine engine wireless sensor system with energy harvesting.

A control system of a gas turbine engine uses sensors to gather data for monitoring performance of the gas turbine engine and controlling operation of the gas turbine engine. Sensor placement within a gas turbine engine can be constrained by environmental conditions and wiring limitations. Some sensors are designated for control purposes and other sensors may be used for diagnostic/prognostic purposes. As more sensors are added, the weight of associated wiring can become significant. Further, wiring runs through hotter sections of the engine can expose portions of the wiring to extreme temperature environments.

BRIEF DESCRIPTION

According to one embodiment, a wireless sensor system of a gas turbine engine of an aircraft can include a plurality of wireless sensors distributed within an engine core of the gas turbine engine and an energy harvesting system including one or more energy harvesting devices configured to convert mechanical or thermal energy within the gas turbine engine into electric power and provide the electric power to the wireless sensors. The wireless sensor system can also include a data concentrator coupled to the gas turbine engine. The data concentrator can be configured to receive a plurality of wireless sensor data from the wireless sensors and transmit the wireless sensor data to a communication adapter of the gas turbine engine.

In addition to one or more of the features described above or below, or as an alternative, further embodiments may include where the data concentrator is powered by one or more of the energy harvesting devices.

In addition to one or more of the features described above or below, or as an alternative, further embodiments may include where the data concentrator includes a first antenna within the engine core, the first antenna configured to communicate wirelessly with the wireless sensors, and a second antenna external to the engine core, the second antenna configured to communicate wirelessly with the communication adapter in an engine fan stream of the gas turbine engine.

In addition to one or more of the features described above or below, or as an alternative, further embodiments may include where the data concentrator is configured to communicate within the engine core with one or more additional instances of the data concentrator communicatively coupled to at least one additional wireless sensor.

In addition to one or more of the features described above or below, or as an alternative, further embodiments may include where the one or more energy harvesting devices include one or more of: a thermoelectric device, a piezoelectric device, a fluid flow harvesting device, a pyroelectric device, an electrostatic device, and a magnetic induction device.

In addition to one or more of the features described above or below, or as an alternative, further embodiments may include where the energy harvesting system includes one or more energy storage devices configured to store electric power produced by at least one of the energy harvesting devices.

In addition to one or more of the features described above or below, or as an alternative, further embodiments may include where the communication adapter is configured communicate wirelessly with an offboard system using a different frequency spectrum than the data concentrator and the wireless sensors, and the communication adapter is configured to transmit the wireless sensor data over a wired connection to an engine control of the gas turbine engine.

According to an embodiment, a method includes providing electric power to a plurality of wireless sensors in an engine core of a gas turbine engine using an energy harvesting system in the gas turbine engine, where the energy harvesting system includes one or more energy harvesting devices configured to convert mechanical or thermal energy within the gas turbine engine into electric power. The method also includes transmitting a plurality of wireless sensor data from the wireless sensors to a data concentrator coupled to the gas turbine engine, transmitting the wireless sensor data from the data concentrator to a communication adapter of the gas turbine engine, storing a data set in the communication adapter based on the wireless sensor data, and transmitting the data set wirelessly from the communication adapter to an offboard system based on a transmit condition.

In addition to one or more of the features described above or below, or as an alternative, further embodiments may include powering the data concentrator by one or more of the energy harvesting devices.

In addition to one or more of the features described above or below, or as an alternative, further embodiments may include using a first antenna of the data concentrator to communicate wirelessly the wireless sensors, where the first antenna is within the engine core, and using a second antenna to communicate wirelessly with the communication adapter, where the second antenna is external to the engine core in an engine fan stream of the gas turbine engine.

In addition to one or more of the features described above or below, or as an alternative, further embodiments may include communicating within the engine core between the data concentrator and one or more additional instances of the data concentrator communicatively coupled to at least one additional wireless sensor.

In addition to one or more of the features described above or below, or as an alternative, further embodiments may include forming an enhanced data set at the communication adapter based on the wireless sensor data, a plurality of internal sensor data of the communication adapter, and a plurality of engine control parameters from an engine control of the gas turbine engine, transmitting the enhanced data set to an offboard system, and transmitting the enhanced data set to an engine control of the engine over a wired connection.

According to an embodiment, a gas turbine engine of an aircraft includes a fan section with a fan case, an engine control mounted on the fan case, and a communication adapter mounted on the fan case. The engine control is configured to monitor and control operation of the gas turbine engine in real-time. The gas turbine engine further comprises an engine core, a plurality of wireless sensors distributed within the engine core, an energy harvesting system including one or more energy harvesting devices configured to convert mechanical or thermal energy within the gas turbine engine into electric power and provide the electric power to the wireless sensors, and a data concentrator configured to receive a plurality of wireless sensor data from the wireless sensors and transmit the wireless sensor data to the communication adapter.

In addition to one or more of the features described above or below, or as an alternative, further embodiments may include where the data concentrator is powered by one or more of the energy harvesting devices and the data concentrator includes a first antenna within the engine core, the first antenna configured to communicate wirelessly with the wireless sensors, and a second antenna external to the engine core and within an engine fan stream of the gas turbine engine, the second antenna configured to communicate wirelessly with the communication adapter.

A technical effect of the apparatus, systems and methods is achieved by incorporating a wireless sensor system that utilizes energy harvesting in an engine system as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
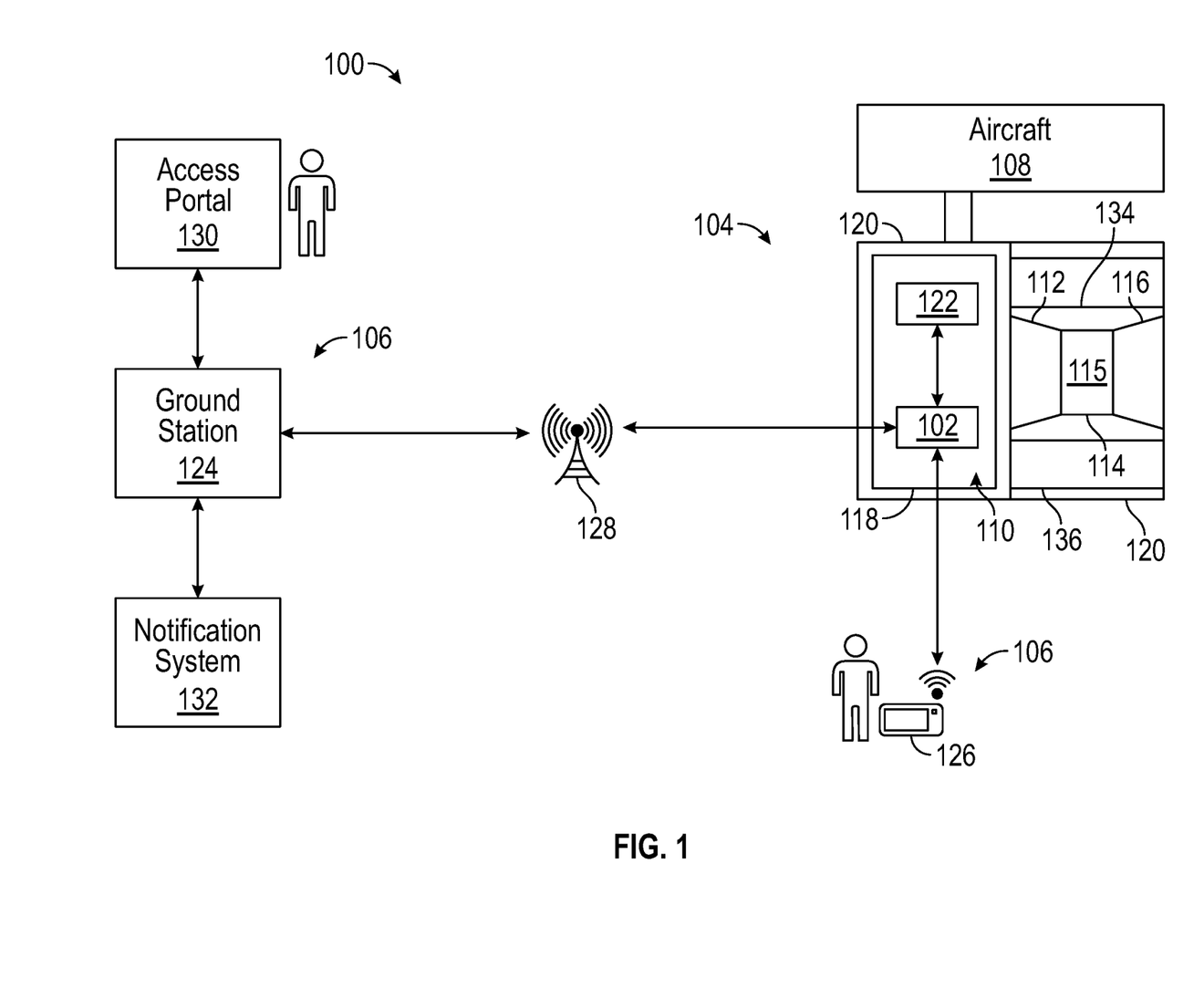
FIG. 1 is a block diagram of a system supporting wireless communication between an engine and offboard systems, in accordance with an embodiment of the disclosure.

Referring now to the drawings, FIG. 1 illustrates a system 100 supporting wireless communication between a communication adapter 102 of a gas turbine engine 104 and a plurality of offboard systems 106. The gas turbine engine 104 can be coupled to an aircraft 108, where the aircraft 108 can include multiple instances of the gas turbine engine 104. The gas turbine engine 104 can include a fan section 110, a compressor section 112, a combustor section 114, and a turbine section 116. The fan section 110 drives air along a bypass flow path, while the compressor section 112 drives air along a core flow path for compression and flow into the combustor section 114 then expansion through the turbine section 116. A fan case 118 of the fan section 110 can be covered by a fan cowling 120 and may provide an installation surface that is cooler than other sections 112-116 of the gas turbine engine 104. Within the fan cowling 120, an engine core cowl 134 and a fan core cowl 136 define a volume in which an engine fan stream 117 (FIG. 3) from the fan section 110 can flow.

An engine control 122 can be mounted on the fan case 118 and covered by the fan cowling 120. The engine control 122 is configured to monitor and control operation of the gas turbine engine 104 in real-time. In order to transfer configuration items, such as programs and data to and from the engine control 122, contemporary systems typically require that the fan cowling 120 is opened and multiple cables of bundled wires are coupled to the engine control 122. Such a process can ensure deliberate actions are taken in extracting data and performing updates to the engine control 122; however, the process can be slow and require large lengths of customized cables. In embodiments, the communication adapter 102, also referred to as a gas turbine engine communication gateway, is configured to establish communication with the engine control 122 (e.g., over a wired connection) and wireless communication with one or more offboard systems 106 external to the aircraft 108 (e.g., over a wireless connection). Similar to the engine control 122, the communication adapter 102 can be mounted on the fan case 118 and covered by the fan cowling 120 of the gas turbine engine 104. Wireless communication can alleviate the need for customized cables or physically opening the fan cowling 120 to establish communication with the offboard systems 106.

The offboard systems 106 can include, for example, a ground station 124, a near-wing maintenance computer 126, an access portal 130, and/or other devices (not depicted) that may establish one-way or two-way wireless communication with the communication adapter 102. For example, a global positioning system (GPS) can provide one-way wireless signaling to the communication adapter 102 to assist in confirming a geographic location of the gas turbine engine 104 while the communication adapter 102 is coupled to the gas turbine engine 104. Wireless communication performed by the communication adapter 102 can be through a variety of technologies with different ranges supported. As one example, the communication adapter 102 can support Wi-Fi (e.g., radio wireless local area networking based on IEEE 802.11 or other applicable standards), GPS, cellular networks, satellite communication, and/or other wireless communication technologies known in the art. Wireless communication between the communication adapter 102 and the offboard systems 106 can be direct or indirect. For instance, wireless communication between the communication adapter 102 and ground station 124 may pass through one or more network interface components 128, such as a repeater, while wireless communication between the communication adapter 102 and the near-wing maintenance computer 126 may be direct wireless communication without any relay components.

The ground station 124 can enable communication with a variety of support systems, such as an access portal 130 that enables authorized users to access data, initiate tests, configure software, and perform other actions with respect to the engine control 122, where the communication adapter 102 acts as a secure gateway to limit access and interactions with the engine control 122. As another example, the ground station 124 can communicate with a notification system 132, which may trigger alerts, text messages, e-mails, and the like to authorized recipients regarding operational status of the gas turbine engine 104. The near-wing maintenance computer 126 may provide an authorized user with limited authority a capability to query the communication adapter 102 for fault data, test parameters, and other such information. In some embodiments, the near-wing maintenance computer 126 can be authorized with limited authority to make updates to select configuration parameters, software executable or data collection parameters of the communication adapter 102.

Figure 2:
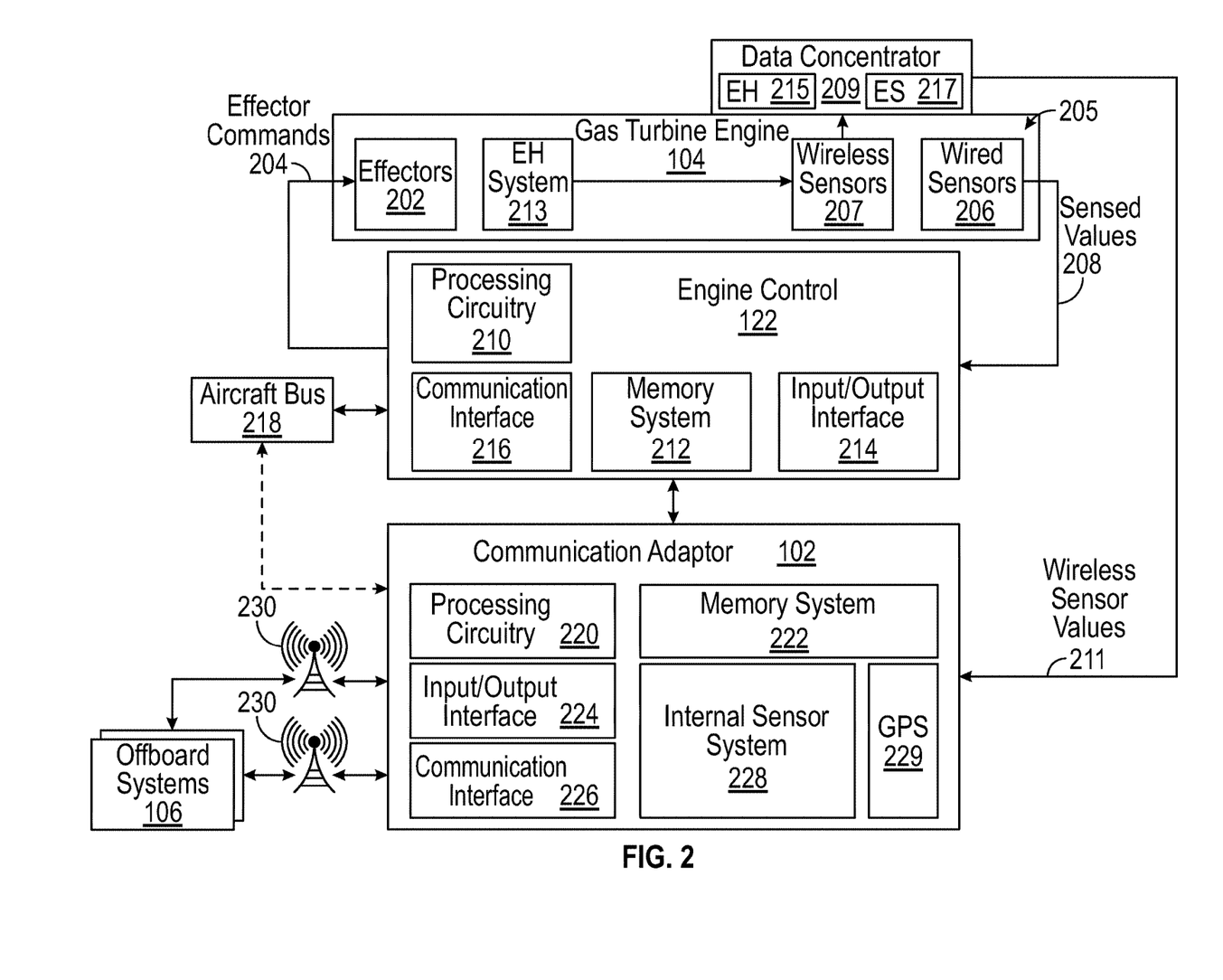
FIG. 2 is a block diagram illustrating further details of the system of FIG. 1, in accordance with an embodiment of the disclosure.

FIG. 2 is a block diagram illustrating further details of the system 100 of FIG. 1, in accordance with an embodiment of the disclosure. The engine control 122 can control effectors 202 of the gas turbine engine 104 by generating one or more effector commands 204. Examples of effectors 202 can include one or more motors, solenoids, valves, relays, pumps, heaters, and/or other such actuation control components. A plurality of wired sensors 206 can capture state data associated with the gas turbine engine 104 and provide sensed values 208 as feedback to the engine control 122 to enable closed-loop control of the gas turbine engine 104 according to one or more control laws. The gas turbine engine 104 can also include a plurality of wireless sensors 207 that are configured to wirelessly communicate with one or more data concentrator 209 as part of a wireless sensor system 205, which can further communicate a plurality of wireless sensor values 211 to the communication adapter 102 with a wireless sensor antenna 306 (FIG. 3) located in an engine fan stream 117. Examples of the wired sensors 206 and/or wireless sensors 207 can include one or more temperature sensors, pressure sensors, strain gauges, speed sensors, accelerometers, lube sensors, and the like.

To support operation of the wireless sensor system 205, an energy harvesting system 213 of the gas turbine engine 104 can include one or more energy harvesting devices 215 configured to convert mechanical or thermal energy within the gas turbine engine 104 into electric power and provide the electric power to the wireless sensors 207. Further, the data concentrator 209 can be powered by one or more of the energy harvesting devices 215. The energy harvesting devices 215 can be in close proximity to the wireless sensors 207 or the data concentrator 209 and may be incorporated therein. Further, the energy harvesting devices 215 may be shared between multiple wireless sensors 207, such that a one-to-one relationship between the energy harvesting devices 215 and wireless sensors need not exist. Examples of the energy harvesting devices can include one or more of: a thermoelectric device, a piezoelectric device, a fluid flow harvesting device, a pyroelectric device, an electrostatic device, and a magnetic induction device. The energy harvesting system can also include one or more energy storage devices 217 configured to store electric power produced by at least one of the energy harvesting devices 215. The energy storage devices 217 can include, for example, a battery, a capacitor, a super-capacitor, an ultra-capacitor, and/or any energy storage device known in the art to store electric power.

The engine control 122 can be a full authority digital engine control that includes processing circuitry 210 and a memory system 212 configured to store a plurality of configuration items, where at least one of the configuration items includes a sequence of the computer executable instructions for execution by the processing circuitry 210. Other types of configuration items can include but are not limited to data, such as constants, configurable data, and/or fault data. Examples of computer executable instructions can include boot software, operating system software, and/or application software. The executable instructions may be stored or organized in any manner and at any level of abstraction, such as in connection with controlling and/or monitoring operation of the gas turbine engine 104. The processing circuitry 210 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 212 may include volatile memory, such as random access memory (RAM), and non-volatile memory, such as Flash memory, read only memory (ROM), and/or other electronic, optical, magnetic, or any other computer readable medium onto which is stored data and algorithms in a non-transitory form.

The engine control 122 can also include one or more of an input/output interface 214, a communication interface 216, and/or other elements (not depicted). The input/output interface 214 can include support circuitry for interfacing with the effectors 202 and wired sensors 206, such as filters, amplifiers, digital-to-analog converters, analog-to-digital converters, and other such circuits to support digital and/or analog interfaces. Further, the input/output interface 214 can receive or output signals to/from other sources. The communication interface 216 can be communicatively coupled to the communication adapter 102. The communication interface 216 may also communicate with an aircraft bus 218 of the aircraft 108 of FIG. 1. The aircraft bus 218 may provide aircraft-level parameters and commands that are used by the engine control 122 to control the gas turbine engine 104 in real-time.

Similar to the engine control 122, the communication adapter 102 can include processing circuitry 220, a memory system 222, an input/output interface 224, and a communication interface 226. The processing circuitry 220 can be any type or combination of central processing unit (CPU), including one or more of: a microprocessor, a digital signal processor (DSP), a microcontroller, an application specific integrated circuit (ASIC), a field programmable gate array (FPGA), or the like. Also, in embodiments, the memory system 222 may include volatile memory, such as random access memory (RAM), and non-volatile memory, such as Flash memory, read only memory (ROM), a hard disk drive, and/or other electronic, optical, magnetic, or any other computer readable medium onto which is stored data and algorithms in a non-transitory form. The communication adapter 102 can also include an internal sensor system 228. The internal sensor system 228 can include, for example, one or more accelerometers, gyroscopes, barometers, a magnetometer (e.g., a compass), and other such sensors. Further, the communication adapter 102 can include other devices, such as a GPS 229. The input/output interface 224 can process data collected from the internal sensor system 228 and condition the data in a format usable by the processing circuitry 220. The communication interface 226 can interface with one or more antennas 230 and 306 (FIG. 3), which may be integrated with the communication adapter 102 or located remotely from the communication adapter 102, e.g., a shark-fin antenna mounted under or on the fan cowling 120 of FIG. 1. Although depicted separately in FIGS. 1 and 2, in some embodiments the engine control 122 and communication adapter 102 can be combined, for instance, where the communication adapter 102 is a module or processing core within the engine control 122.

The communication adapter 102 can act as a secure communication gateway with respect to the offboard systems 106. For example, the offboard systems 106 can request to load new/updated configuration items to the memory system 212 of the engine control 122 through the communication adapter 102. The communication interface 216 of the engine control 122 can interface to the communication interface 226 of the communication adapter 102 through a wired, optical, or magnetic coupling. The communication interface 226 can communicate wirelessly through one or more antennas 230 to the offboard systems 106. The communication interface 226 may also have access to receive data directly from the aircraft bus 218 in some embodiments. In alternate embodiments, the communication adapter 102 can send a request to the engine control 122 to provide aircraft parameters received via the aircraft bus 218 and/or engine parameters computed by the engine control 122. For enhanced security, the communication adapter can be configured to communicate wirelessly with offboard systems 106 using a different frequency spectrum than is used by the data concentrator 209 and the wireless sensors 207.

The communication adapter 102 can manage credentials and user authentication to limit access of the memory system 212 of the engine control 122. User authentication can be defined for particular users or classes of users, such as equipment-owner users, maintenance technicians, engineering users, and the like. For example, a maintenance technician may have authority to adjust trimmable constants or reprogram certain regions of the memory system 212. An engineering user may have authority to reprogram an operating system, boot program code, or application software in the memory system 212, in addition to having permissions of the maintenance technician and the equipment-owner user. If user authentication fails, for instance, by user credentials not being recognized with respect to user authentication data, then the communication adapter 102 can block access of the offboard systems 106 from reading from or writing to the memory system 212. Access to the wireless sensor values 211 can also be constrained based on system credentials and permissions.

Configuration items received for the engine control 122 and/or the communication adapter 102 may be encrypted using various cryptographic methods to further enhance security. For example, the communication adapter 102 can apply a cryptographic algorithm using one or more parameters received and cryptographic information to decrypt an encrypted configuration item. A combination of transmitted and stored cryptographic information can be used together for decryption based on 'shared secrets' such that not all of the information is sent from the offboard systems 106 nor stored completely within the communication adapter 102. After decryption, authenticity of the configuration item can be verified using, for example, a digital signature of the configuration item. The resulting file can be a decrypted and authenticated configuration item, which may be temporarily stored in memory system 222 or otherwise buffered during authentication and passed to the engine control 122 upon authentication.

Separating the communication adapter 102 from the engine control 122 can enable the communication adapter 102 and the engine control 122 to have different expected service life durations. For example, to stay compatible with changes in wireless communication technologies used by the offboard systems 106, the communication adapter 102 may be upgraded at a faster interval than the engine control 122. The communication adapter 102 can have a lower processing and storage capacity than the engine control 122 to reduce power requirements, weight, and other costs associated with the communication adapter 102. Since the communication adapter 102 does not actively control the gas turbine engine 104, development cycles may be reduced as compared to implementing flight critical control algorithms and hardware of the engine control 122. Further, the wireless sensor system 205 can support a flexible architecture where various instances of the wireless sensors 207 can be added or removed along with energy harvesting devices 215 and/or energy storage devices 217.

Figure 3:
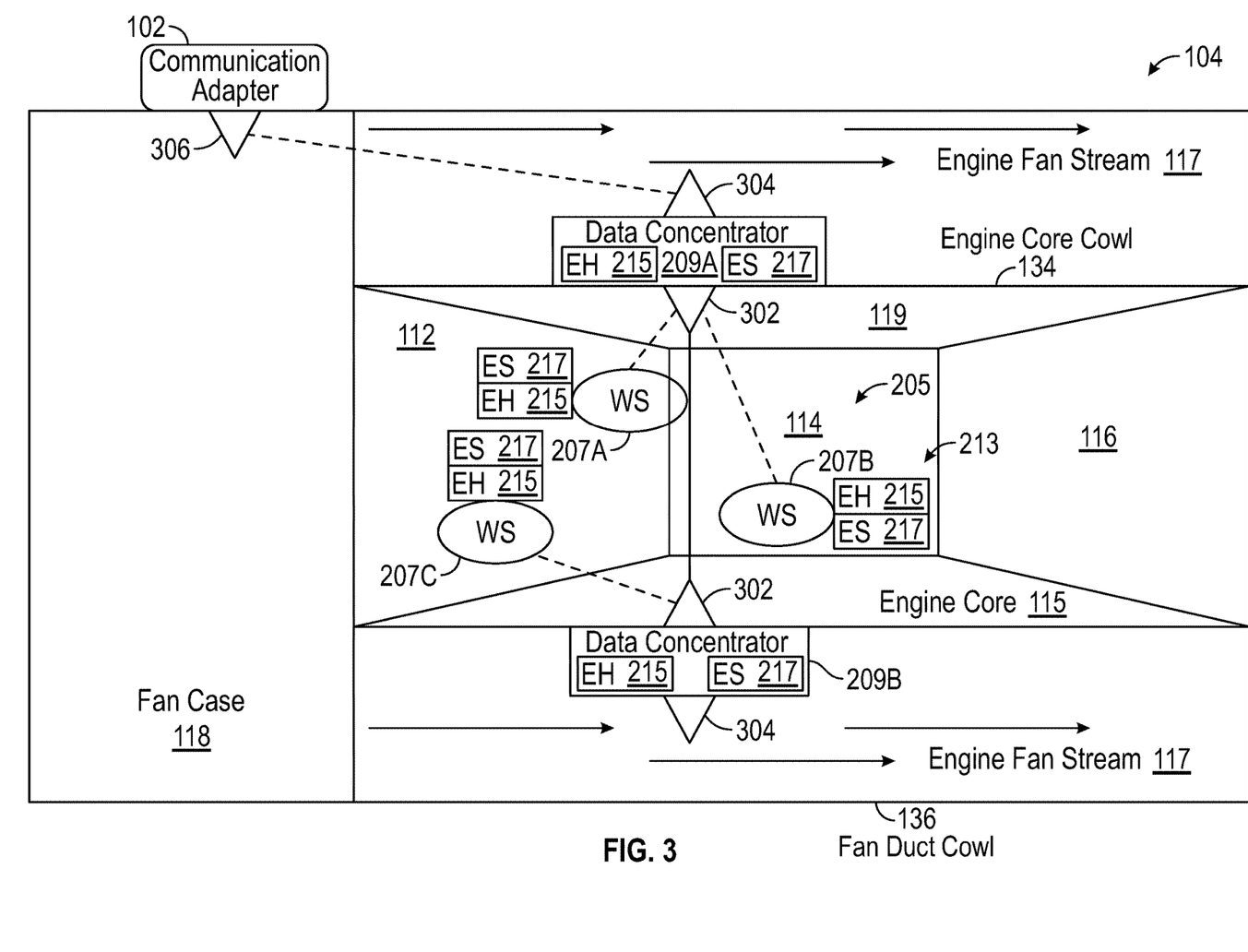
FIG. 3 is a block diagram illustrating further details of a wireless sensor system of FIG. 2, in accordance with an embodiment of the disclosure.

FIG. 3 is a block diagram illustrating further details of the wireless sensor system 205 of FIG. 2 according to an embodiment. In the example of FIG. 3, there are two data concentrators 209, referred to as data concentrators 209A and 209B. Each data concentrator 209A, 209B can have a different assignment of wireless sensors 207. For instance, data concentrator 209A can wirelessly communicate with wireless sensors 207A and 207B, while data concentrator 209B can communicate wirelessly with wireless sensor 207C. The assignment of wireless sensors 207A-207C to data concentrators 209A, 209B can be established based on sensor bandwidth, location constraints, power consumption constraints, and other such factors. The data concentrators 209A, 209B can each include a first antenna 302 within an engine core 115 of the gas turbine engine 104 and a second antenna 304 external to the engine core 115 in the engine fan stream 117 in a volume defined between the engine core cowl 134 and the fan duct cowl 136. The data concentrators 209A, 209B can be mounted on the engine core cowl 134. The first antenna 302 can be within a volume 119 defined between the engine core cowl 134 and other components of the engine core 115, such as components of the compressor section 112, combustor section 114, and turbine section 116. The first antenna 302 is configured to communicate wirelessly with the wireless sensors 207A-207C and/or communicate wirelessly within the engine core 115 between the data concentrators 209A, 209B. For example, based on the location of the data concentrator 209A relative to the communication adapter 102, the second antenna 304 of the data concentrator 209A may be better positioned to reliably communicate wirelessly with an antenna 306 of the communication adapter 102. Thus, data gathered from wireless sensor 207C by data concentrator 209B can be relayed to the first antenna 302 of data concentrator 209A and then sent through the second antenna 304 of data concentrator 209A to the antenna 306 of the communication adapter 102 for further processing. In some embodiments, the data concentrator 209A, 209B can communicate using a wired connection.

The types of energy harvesting devices 215 and energy storage devices 217 used throughout the wireless sensor system 205 and energy harvesting system 213 can vary depending on available energy sources, installation constraints, and other such factors. For example, in areas of the engine core 115 subject to higher amplitude vibration, a piezoelectric energy harvesting device may be preferred. The cooling air of an engine fan stream 117 in combination with available heat from the engine core 115 may make a thermoelectric energy harvesting device preferable in the data concentrators 209A, 209B. Use of energy storage devices 217 may be targeted at locations that have variable energy content or require a longer period of time for sufficient energy to be present.

Figure 4:
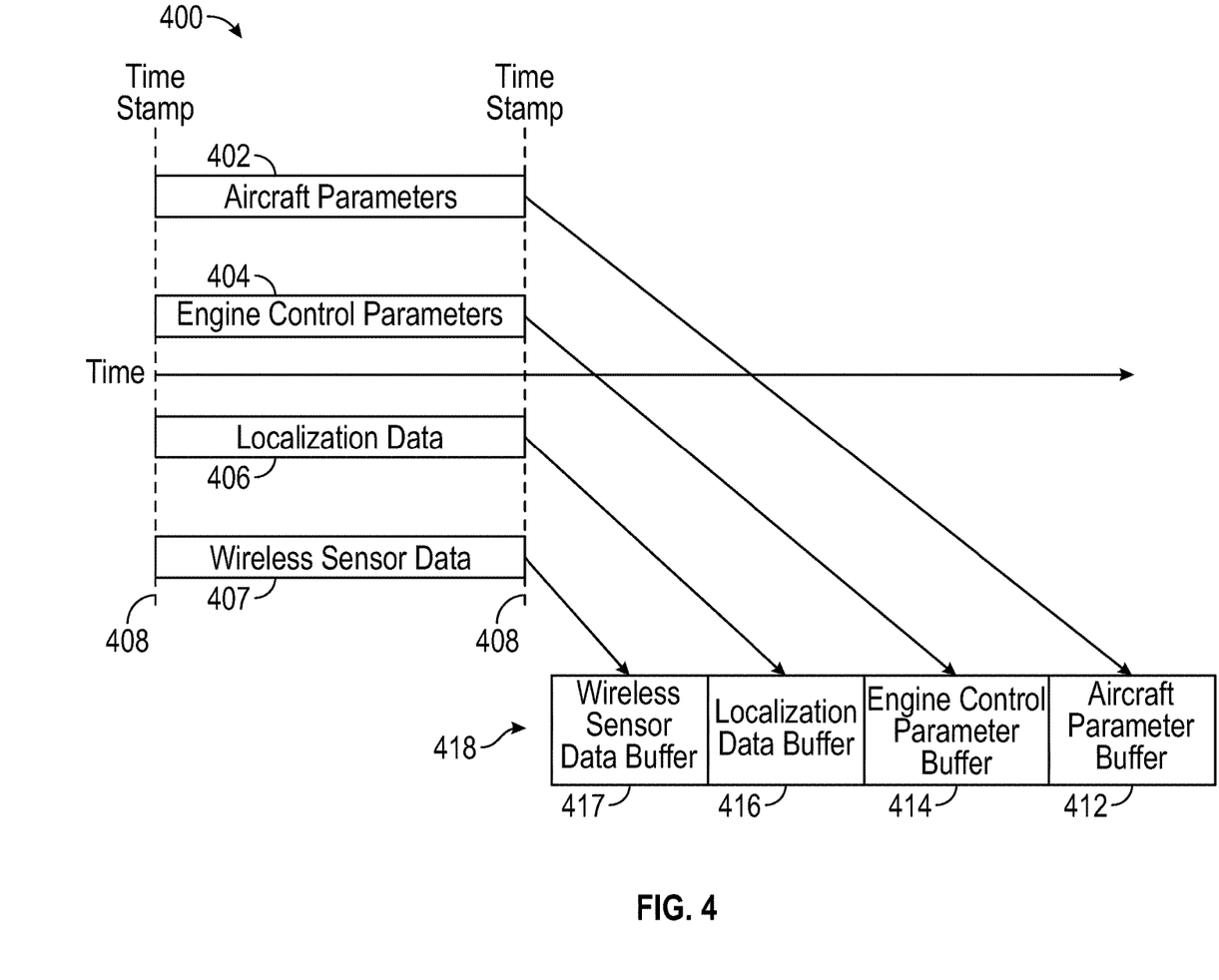
FIG. 4 is a chart depicting time-based merging of data from multiple sources at a communication adapter, in accordance with an embodiment of the disclosure.

FIG. 4 is a chart 400 depicting time-based merging of data from multiple sources at a communication adapter 102, in accordance with an embodiment of the disclosure. In the example of FIG. 4, aircraft parameters 402 can be received on the aircraft bus 218 by the engine control 122 and be forwarded to the communication adapter 102 along with engine control parameters 404 or be directly received by the communication adapter 102. The communication adapter 102 can also access localization data 406 from the internal sensor system 228 and/or GPS 229 of FIG. 2. The communication adapter 102 can collect wireless sensor data 407 based on wireless sensor values 211 of FIG. 2. The aircraft parameters 402, engine control parameters 404, localization data 406, and wireless sensor data 407 can be correlated through one or more time stamps 408. The time stamps 408 can be used to align data values from the aircraft parameters 402, engine control parameters 404, localization data 406, and wireless sensor data 407 into an aircraft parameter buffer 412, engine control parameter buffer 414, localization data buffer 416, and wireless sensor data buffer 417 as an enhanced data set 418. In some embodiments, there can be delays between when the aircraft parameters 402 and engine control parameters 404 are captured and received by the communication adapter 102. Time stamp 408 data can enable alignment of data received with varying delays from the engine control 122 of FIG. 1, the wireless sensor system 205 of FIG. 2, and/or the aircraft bus 218. In some embodiments, the wireless sensor data 407 and/or all or a portion of the enhanced data set 418 can be transmitted to the engine control 122 for diagnostics/prognostics and/or other purposes.

Figure 5:
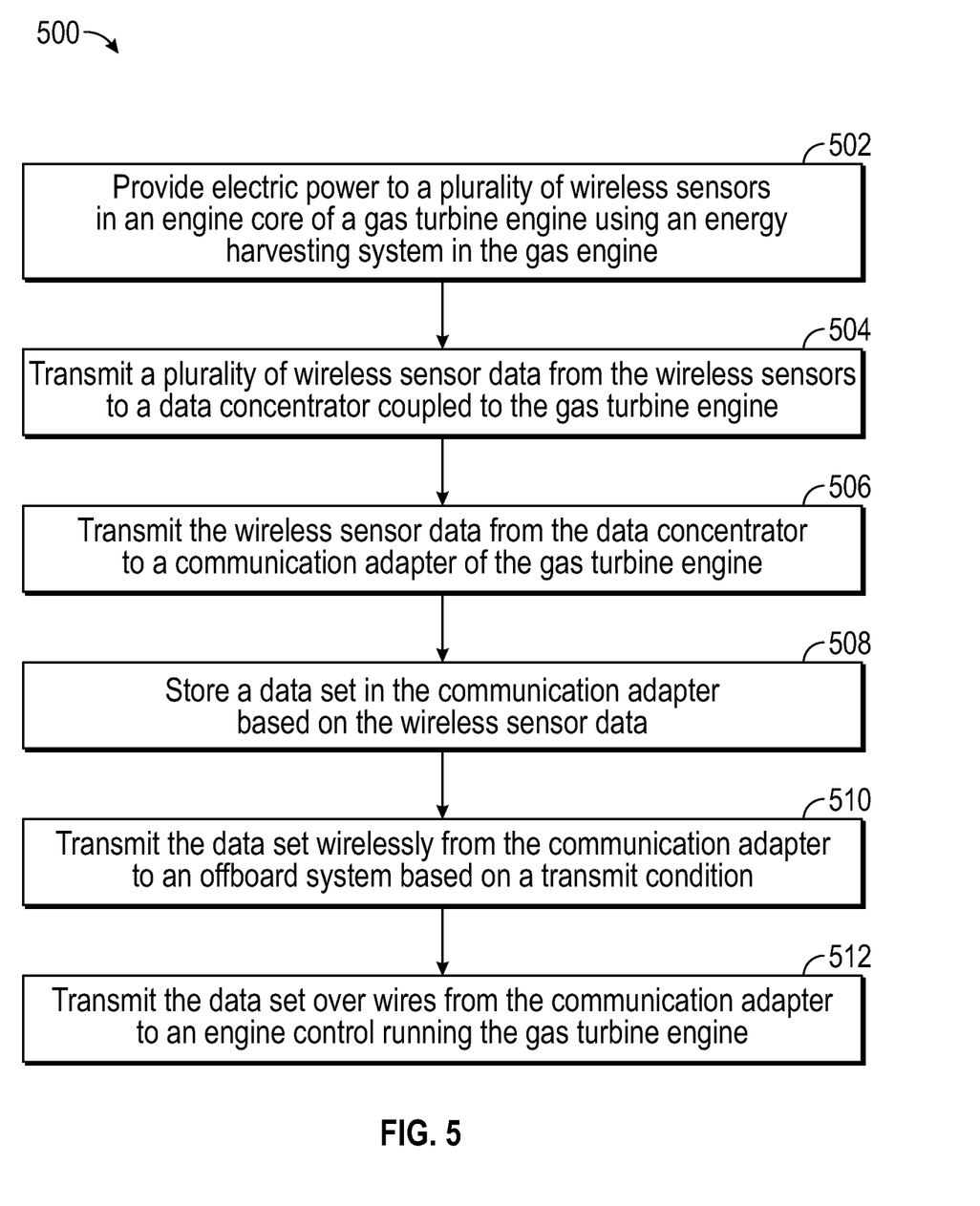
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for using a wireless sensor system 205 with energy harvesting in a gas turbine engine 104, in accordance with an embodiment. The method 500 may be performed, for example, by the communication adapter 102 in conjunction with components of the gas turbine engine 104 and at least one of the offboard systems 106 of FIG. 1.

At block 502, an energy harvesting system 213 provides electric power to a plurality of wireless sensors 207 of a wireless sensor system 205 in an engine core 115 of a gas turbine engine 104. The energy harvesting system 213 can include one or more energy harvesting devices 215 configured to convert mechanical or thermal energy within the gas turbine engine 104 into electric power. The energy harvesting system 213 can include one or more energy storage devices 217 configured to store electric power produced by at least one of the energy harvesting devices 215.

At block 504, a plurality of wireless sensor data 407 is transmitted from the wireless sensors 207 to a data concentrator 209 coupled to the gas turbine engine 104. The data concentrator 209 can be powered by one or more of the energy harvesting devices 215. There can also be wireless communication within the engine core 115 between the data concentrator 209 and one or more additional instances of the data concentrator 209 (e.g., data concentrator 209B) communicatively coupled to at least one additional wireless sensor 207 (e.g., wireless sensor 207C).

At block 506, the wireless sensor data 407 is transmitted from the data concentrator 209 to a communication adapter 102 of the gas turbine engine 104 as wireless sensor values 211 through communication interface 226.

At block 508, a data set is stored in the communication adapter 102 based on the wireless sensor data 407, such as contents of the wireless sensor data buffer 417.

At block 510, the data set is wirelessly transmitted from the communication adapter 102 to an offboard system 106 based on a transmit condition. The transmit condition can be defined based on receiving a command, a volume of data to transmit (e.g., a message size limit), and/or other such information. The communication adapter 102 can be configured to communicate wirelessly with an offboard system 106 using a different frequency spectrum than the data concentrator 209 and the wireless sensors 207. The communication adapter 102 can form an enhanced data set 418 at the communication adapter 102 based on the wireless sensor data 407, a plurality of internal sensor data (e.g., localization data 406) of the communication adapter 102, and a plurality of engine control parameters 404 from an engine control 122 of the gas turbine engine 104 and/or other parameters (e.g., aircraft parameters 402). The communication adapter 102 can transmit the enhanced data set 418 to the offboard system 106. At block 512, the data set can be transmitted over wires from the communication adapter 102 to an engine control 122 running the gas turbine engine 104.

In some embodiment, the communication adapter 102 can receive a plurality of time series data from an engine control 122 during operation of the gas turbine engine 104, such as aircraft parameters 402 and/or engine control parameters 404. The communication adapter 102 can record a plurality of internal sensor data versus time in the memory system 222 based on the internal sensor system 228 until an end condition is met. An end condition can be determined based on an amount of data collected, a time period of data collection, and/or responsive to a command. The internal sensor data can provide one or more of: a position, an orientation, and a g-load coordinated with time stamping, for instance, as localization data 406. The communication adapter 102 can correlate the time series data with the internal sensor data based on an alignment in time to form an enhanced data set 418, which may be represented in a combination of the aircraft parameter buffer 412, engine control parameter buffer 414, localization data buffer 416, and/or wireless sensor data buffer 417. The communication adapter 102 can transmit the enhanced data set 418 from the communication adapter 102 to an offboard system 106 based on a transmit condition. The transmit condition can be defined based on receiving a command, a volume of data to transmit (e.g., a message size limit), and/or other such information.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A wireless sensor system of a gas turbine engine of an aircraft, the wireless sensor system comprising:
    a plurality of wireless sensors distributed within an engine core of the gas turbine engine;
    an energy harvesting system comprising one or more energy harvesting devices configured to convert mechanical or thermal energy within the gas turbine engine into electric power and provide the electric power to the wireless sensors;
    a data concentrator coupled to the gas turbine engine, the data concentrator configured to wirelessly receive a plurality of wireless sensor data from the wireless sensors and transmit the wireless sensor data to a communication adapter of the gas turbine engine, wherein the communication adapter is configured to communicate with an engine control of the gas turbine engine and to communicate wirelessly with an offboard system using a different frequency spectrum than the data concentrator and the wireless sensors; and
    the communication adapter is configured to:
    form an enhanced data set based on the wireless sensor data, a plurality of internal sensor data of the communication adapter, and a plurality of engine control parameters from the engine control of the gas turbine engine;
    transmit the enhanced data set to the offboard system; and
    transmit the enhanced data set to the engine control of the engine over a wired connection.

2. The wireless sensor system of claim 1, wherein the data concentrator is powered by one or more of the energy harvesting devices.

3. The wireless sensor system of claim 1, wherein the data concentrator comprises:
    a first antenna within the engine core, the first antenna configured to communicate wirelessly with the wireless sensors; and
    a second antenna external to the engine core, the second antenna configured to communicate wirelessly with the communication adapter in an engine fan stream of the gas turbine engine.

4. The wireless sensor system of claim 3, wherein the data concentrator is configured to communicate within the engine core with one or more additional instances of the data concentrator communicatively coupled to at least one additional wireless sensor.

5. The wireless sensor system of claim 1, wherein the one or more energy harvesting devices comprise one or more of: a thermoelectric device, a piezoelectric device, a fluid flow harvesting device, a pyroelectric device, an electrostatic device, and a magnetic induction device.

6. The wireless sensor system of claim 5, wherein the energy harvesting system comprises one or more energy storage devices configured to store electric power produced by at least one of the energy harvesting devices.

7. A method comprising:
    providing electric power to a plurality of wireless sensors in an engine core of a gas turbine engine using an energy harvesting system in the gas turbine engine, wherein the energy harvesting system comprises one or more energy harvesting devices configured to convert mechanical or thermal energy within the gas turbine engine into electric power;
    transmitting a plurality of wireless sensor data wirelessly from the wireless sensors to a data concentrator coupled to the gas turbine engine;
    transmitting the wireless sensor data from the data concentrator to a communication adapter of the gas turbine engine, wherein the communication adapter is configured to communicate with an engine control of the gas turbine engine and to communicate wirelessly with an offboard system using a different frequency spectrum than the data concentrator and the wireless sensors;
    storing a data set in the communication adapter based on the wireless sensor data;
    transmitting the data set wirelessly from the communication adapter to an offboard system based on a transmit condition;
    forming an enhanced data set at the communication adapter based on the wireless sensor data, a plurality of internal sensor data of the communication adapter, and a plurality of engine control parameters from the engine control of the gas turbine engine;
    transmitting the enhanced data set to the offboard system; and
    transmitting the enhanced data set to the engine control of the engine over a wired connection.

8. The method of claim 7, further comprising:
    powering the data concentrator by one or more of the energy harvesting devices.

9. The method of claim 7, further comprising:
    using a first antenna of the data concentrator to communicate wirelessly the wireless sensors, wherein the first antenna is within the engine core; and
    using a second antenna to communicate wirelessly with the communication adapter, wherein the second antenna is external to the engine core in an engine fan stream of the gas turbine engine.

10. The method of claim 9, further comprising:
    communicating within the engine core between the data concentrator and one or more additional instances of the data concentrator communicatively coupled to at least one additional wireless sensor.

11. The method of claim 7, wherein the one or more energy harvesting devices comprise one or more of: a thermoelectric device, a piezoelectric device, a fluid flow harvesting device, a pyroelectric device, an electrostatic device, and a magnetic induction device.

12. The method of claim 11, wherein the energy harvesting system comprises one or more energy storage devices configured to store electric power produced by at least one of the energy harvesting devices.

13. A gas turbine engine of an aircraft, the gas turbine engine comprising:
    a fan section comprising a fan case;
    an engine control mounted on the fan case, the engine control configured to monitor and control operation of the gas turbine engine in real-time;
    a communication adapter mounted on the fan case;
    an engine core;
    an engine core cowl and a fan core cowl that define a volume in which an engine fan stream is configured to flow from the fan section external of the engine core;
    a plurality of wireless sensors distributed within the engine core;
    an energy harvesting system comprising one or more energy harvesting devices configured to convert mechanical or thermal energy within the gas turbine engine into electric power and provide the electric power to the wireless sensors;
    a data concentrator configured to receive a plurality of wireless sensor data from the wireless sensors and transmit the wireless sensor data to the communication adapter, wherein the data concentrator is mounted on the engine core cowl and to communicate wirelessly with an offboard system using a different frequency spectrum than the data concentrator and the wireless sensors; and the communication adapter is configured to:

form an enhanced data set based on the wireless sensor data, a plurality of internal sensor data of the communication adapter, and a plurality of engine control parameters from the engine control of the gas turbine engine;

transmit the enhanced data set to the offboard system; and transmit the enhanced data set to the engine control of the engine over a wired connection.

14. The gas turbine engine of claim 13, wherein the data concentrator is powered by one or more of the energy harvesting devices, and the data concentrator comprises:

a first antenna within the engine core, the first antenna configured to communicate wirelessly with the wireless sensors; and a second antenna external to the engine core and within an engine fan stream of the gas turbine engine, the second antenna configured to communicate wirelessly with the communication adapter.

15. The gas turbine engine of claim 14, wherein the data concentrator is configured to communicate within the engine core with one or more additional instances of the data concentrator communicatively coupled to at least one additional wireless sensor.

16. The gas turbine engine of claim 13, wherein the one or more energy harvesting devices comprise one or more of: a thermoelectric device, a piezoelectric device, a fluid flow harvesting device, a pyroelectric device, an electrostatic device, and a magnetic induction device.

17. The gas turbine engine of claim 16, wherein the energy harvesting system comprises one or more energy storage devices configured to store electric power produced by at least one of the energy harvesting devices.

* * * * *